(Model.) 4 Sheets—Sheet 1.

M. W. KNOX.
SELF BINDING HARVESTER.

No. 306,496. Patented Oct. 14, 1884.

Witnesses.
J. M. Caldwell
A. J. Sangster

Inventor.
Melvin W. Knox
By James Sangster
Atty.

(Model.)

4 Sheets—Sheet 2.

M. W. KNOX.
SELF BINDING HARVESTER.

No. 306,496. Patented Oct. 14, 1884.

Witnesses.
J. M. Caldwell.
A. J. Sangster.

Inventor.
Melvin W. Knox
By James Sangster
Atty (Model.) 4 Sheets—Sheet 3.
M. W. KNOX.
SELF BINDING HARVESTER.
No. 306,496. Patented Oct. 14, 1884.

Witnesses.
J. M. Caldwell.
A. J. Sangster.

Inventor.
Melvin W. Knox,
By James Sangster
His Attorney.

(Model.) 4 Sheets—Sheet 4.

M. W. KNOX.
SELF BINDING HARVESTER.

No. 306,496. Patented Oct. 14, 1884.

Witnesses.
J. H. Caldwell.
A. J. Sangster.

Inventor.
Melvin W. Knox
By James Sangster
Atty.

UNITED STATES PATENT OFFICE.

MELVIN W. KNOX, OF SHERIDAN, ASSIGNOR OF ONE-HALF TO ADELIA M. SAUNDERS, OF HAMBURG, NEW YORK.

SELF-BINDING HARVESTER.

SPECIFICATION forming part of Letters Patent No. 306,496, dated October 14, 1884.

Application filed April 25, 1883. (Model.)

*To all whom it may concern:*

Be it known that I, MELVIN W. KNOX, a citizen of the United States, residing in Sheridan Center, in the county of Chautauqua and State of New York, have invented certain new and useful Improvements in Self-Binding Harvesters, of which the following is a specification.

My invention relates to certain improvements in self-binding harvesters in which twine is used as the binding material, which improvements will be fully and clearly hereinafter described, and shown by the accompanying drawings, in which—

Figure 1:
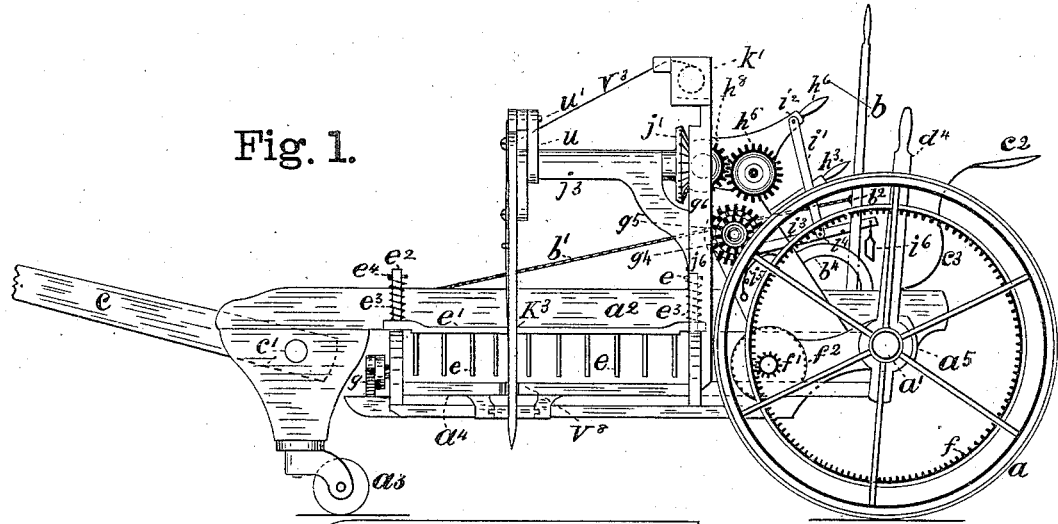
Figure 2:
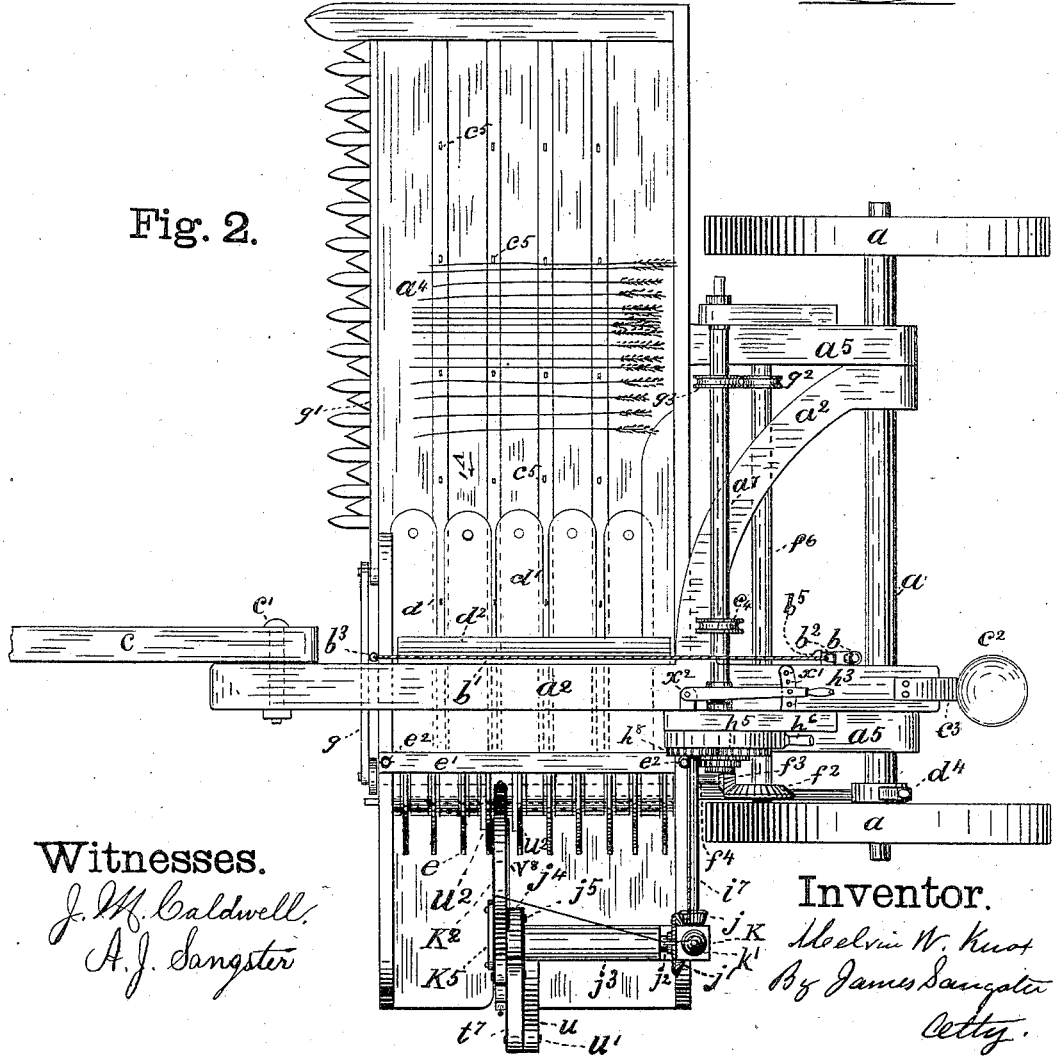
Figure 3:
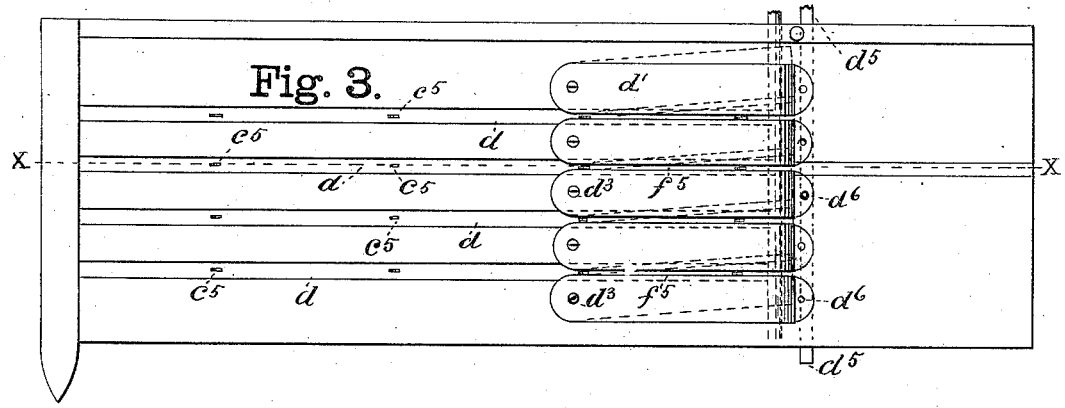
Figure 4:
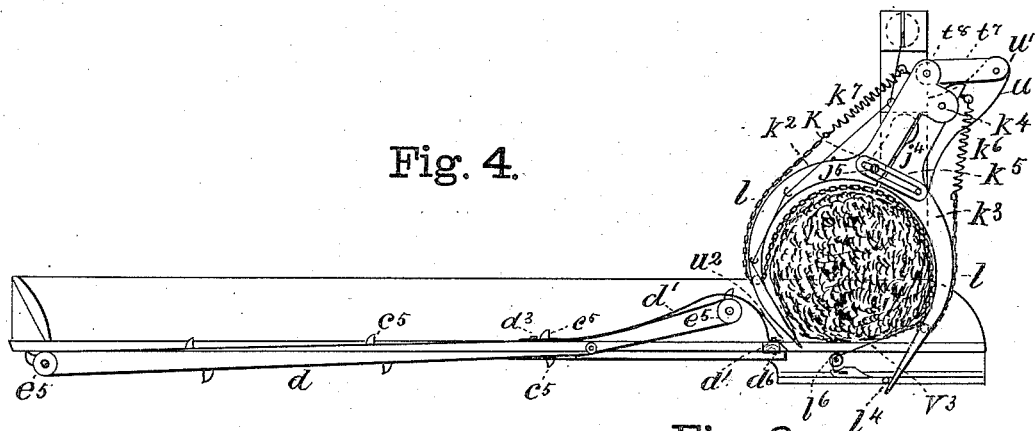
Figure 5:
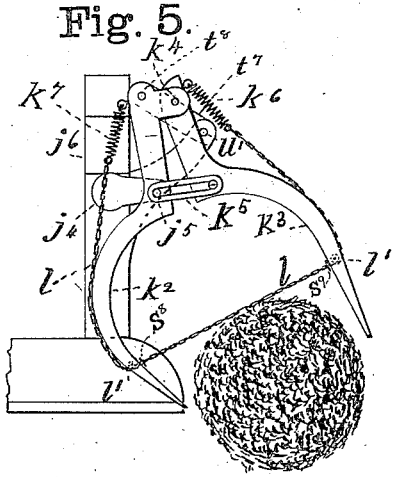
Figure 6:
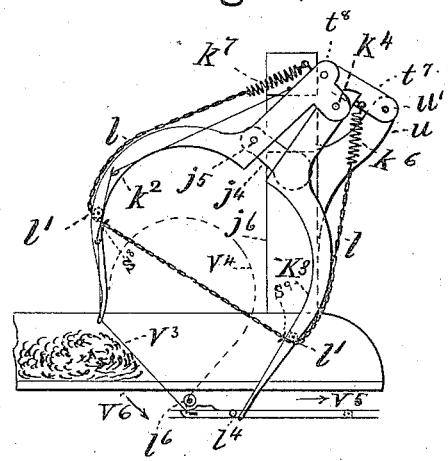
Figure 7:
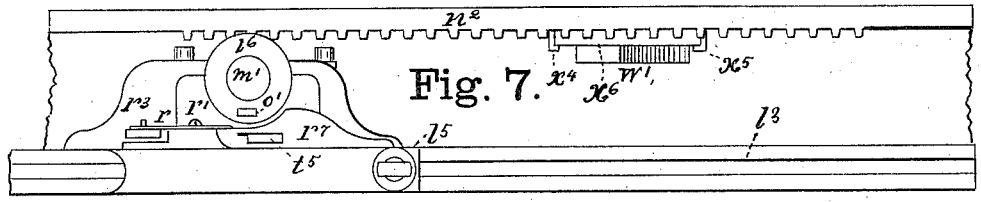
Figure 8:
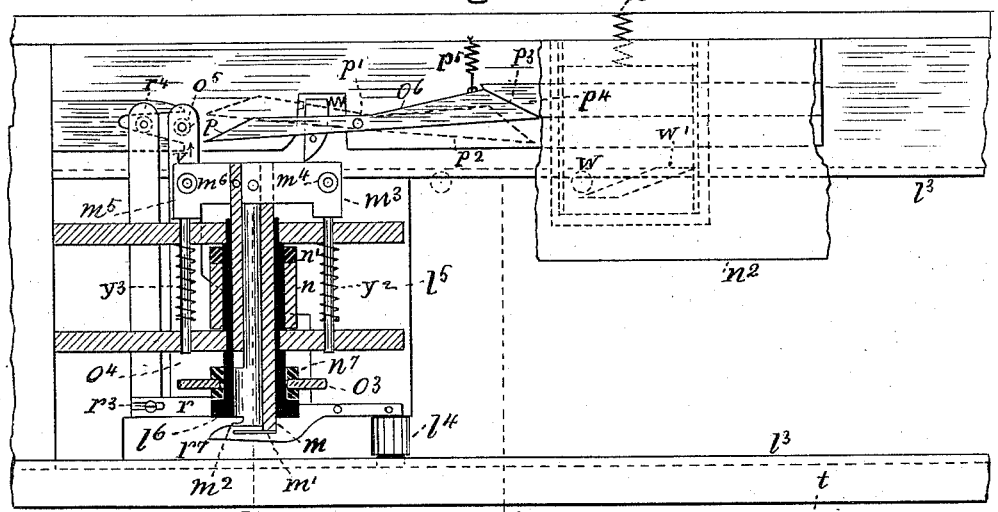
Figures 9, 10:
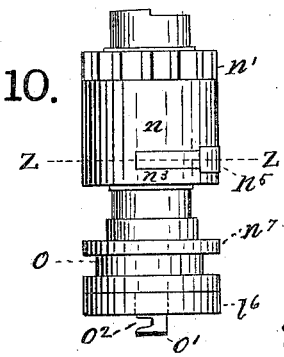
Figure 11:
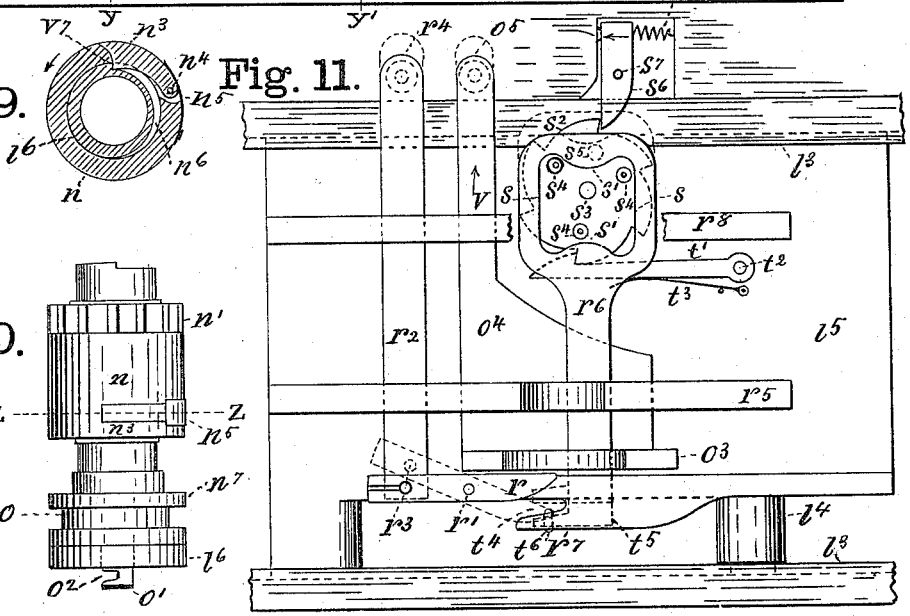
Figure 12:
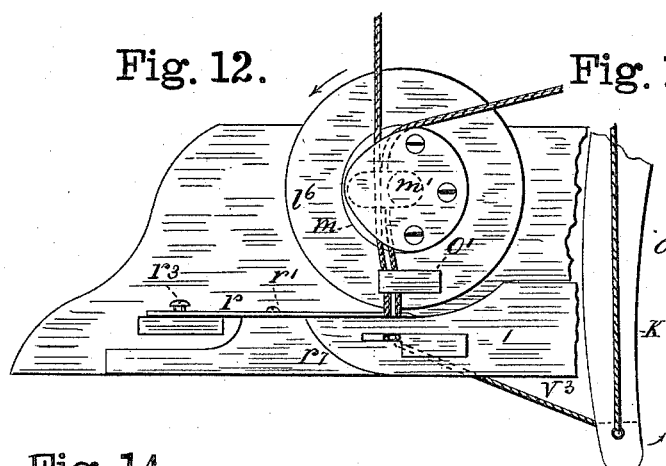
Figure 13:
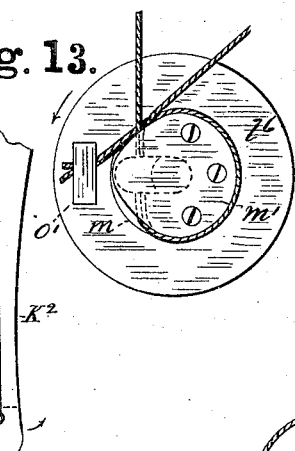
Figure 14:
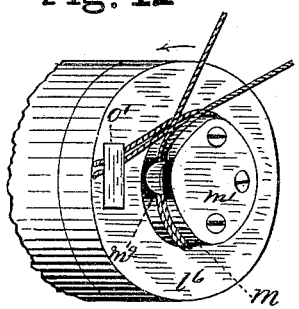
Figure 15:
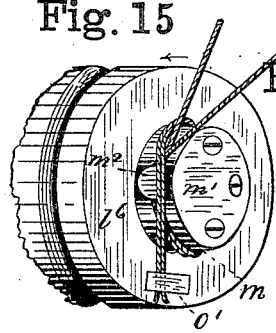
Figures 16, 17:
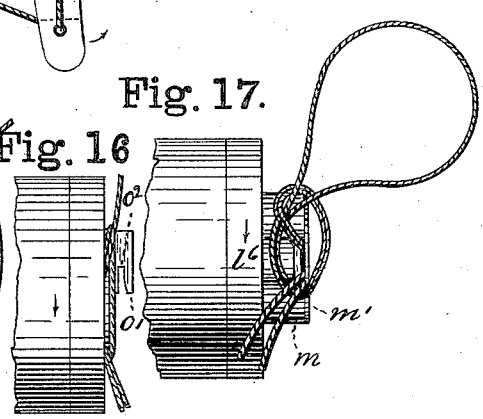
Figure 18:
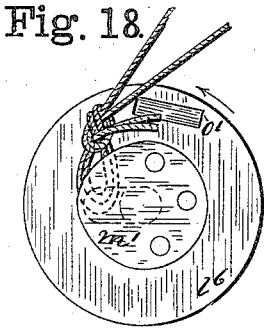
Figures 19, 20:
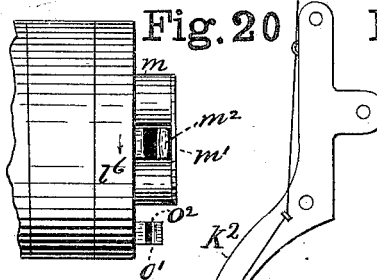
Figure 21:
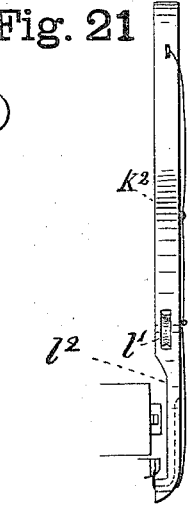
Figure 22:
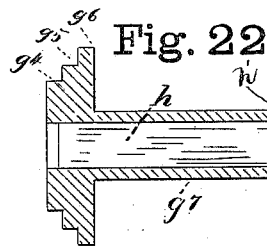

Figure 1 represents a side elevation of the machine complete, looking toward the binding side of the same. Fig. 2 is a plan view of the machine. Fig. 3 is a plan view of the mechanism for carrying the grain forward to the binding apparatus. Fig. 4 is a section through line X X, Fig. 3, and it represents also an elevation of the binding mechanism, showing the device in position for gathering up a bundle preparatory to binding and tying it. Fig. 5 is an elevation of the binding mechanism in position for throwing out the bundle after being bound and tied; and Fig. 6 is a similar view of the binding device in position for receiving and gathering in a bundle. Fig. 7 is a front end view of the knotting or tying device. Fig. 8 is a plan view of the same, showing a portion of that part which sustains the rack broken away, and a part of the knotting device in section. Fig. 9 is an enlarged cross-section through line Z Z, Fig. 10. Fig. 10 is an enlarged side elevation of the knotting device. Fig. 11 is an enlarged plan view of the lower twine-holding device and the mechanism for operating it, and also a similar view of a portion of the carriage and the ways in which it slides, and a similar view of the twine-cutting device, showing a portion of the mechanism for operating it. Fig. 12 is a front end elevation of the knotting and cutting device, showing it in position for receiving, holding, and cutting the twine preparatory to tying the knot. Fig. 13 is a front end elevation of the knot-tying device, showing sufficient twine for binding a bundle cut off and held by the looping-hook, the same having made three-quarters of a revolution in the direction of the arrow. Fig. 14 is a perspective view of a portion of the same, showing it after having made three-quarters of a revolution around the non-revolving stem, and the knot-forming hook drawn in, and a portion of the twine drawn in with it. Fig. 15 is a perspective view of the front part of the knotter, showing it after the looping-hook has made one complete revolution, and showing a portion of the twine drawn in and the end of the twine drawn around so as to pass outside of the knot-forming hook, in which position it is secured by the springing or sliding out of the said hook against a plate on the end of the non-revolving stem. Fig. 16 is a side elevation of the front portion of the knotter, showing the end of the non-revolving stem drawn in so as to slide the loop off from it, the cut ends of the twine being released from the looping-hook. Fig. 17 is a similar view showing the non-revolving stem as moved forward, and all that portion of the knot released except the ends of the cord, which are secured between the outside end of the knot-forming hook and the plate on the non-revolving stem. Fig. 18 represents a front view of a portion of the knotter, showing the twine and knot in the position in which it is held until it is thrown out with the bundle. Fig. 19 is a side elevation of a portion of the knotter, showing it in position for starting. Fig. 20 is an enlarged side elevation of the binder-arm. Fig. 21 is an edge view of the same and a diagram of a portion of the knotter. Fig. 22 represents an enlarged side elevation of the shaft and a section through the gearing arranged to slide back and forth thereon.

The driving-wheels $a$ are made in the usual way and connected to the shaft $a'$.

$a^2$ represents a large frame, the rear portion of which is hung to the main shaft $a'$, and the front part is supported by a caster-wheel, $a^3$. The platform $a^4$ is hinged to the main shaft by the arms $a^5$ $a^5$, and is raised or lowered by means of a lever, $b$, pivoted to the frame $a^2$, and a cord or chain, $b'$, (which is connected to the lever by a joint, $b^2$, or other suitable well-known means,) and passes from thence toward the front of the beam or frame $a^2$, and through a staple, $b^3$, or over a friction-pulley, and is then fastened to the front of the platform.

The frame $a^2$ is provided with a curved bar, $b^4$, having a stop, $b^5$, against which the lever $b$ is fastened when the platform is raised. It is made in the usual way, so as to be easily engaged or disengaged for raising or lowering the platform, and requires no further description here.

$c$ represents the pole of the machine, jointed to the beam $a^2$ by a bolt, $c'$. This arrangement takes the weight of the machine off from the horses and allows it to draw easily.

At the rear end of the beam $a^2$ is the driver's seat $c^2$. It is secured upon a spring-support, $c^3$, made in the ordinary way. The grain, when the machine is in operation, is turned over onto the platform by an ordinary reel driven by a pulley, $c^4$. The reel, being of the usual construction, is not shown here. As the grain is laid upon the platform it is caught by the teeth $c^5$, arranged upon belts $d$, and is carried forward up over the parts $d'$ and under the shield and compressor $d^2$. (See Fig. 2.) The parts $d'$ are made usually of sheet-iron, and are each arranged so as to turn on pins $d^3$ by means of the hand-lever $d^4$ and a horizontal bar, $d^5$, arranged below them and connected to them by pins $d^6$, arranged so as to form joints in any well-known way. (See Figs. 3 and 4.) The shield and compressor $d^2$ is composed of a series of bent rods, $e'$, connected to a bar, $e'$, and the sheet-iron portion $d^2$ at the opposite side, which bar passes over two uprights bolts, $e^2$, having spiral or other equivalent springs, $e^3$, arranged on the bolts $e^2$ and secured by pins $e^4$. The endless belts $d$ receive their motion from the rollers $e^5$ and gear $f$ on the driving-wheel, which engages with the pinions $f'$ and operates the bevel-wheel $f^2$, which in turn operates the bevel-wheel $f^3$ and rollers $e^5$.

The object in making the parts $d'$ movable sidewise is to provide for different lengths of grain. For long grain it is moved forward toward the front of the machine, and in the opposite direction for shorter grain. The teeth $c^5$ in the belts pass between the parts $d'$, through the opening $f^5$, and are guided thereby, and also the belts to which they are connected. In the drawings I have shown the ordinary leather belting; but chain gearing or other belting may be used, if desired. The gearing for operating all parts of the machine is driven by the gear $f$ on the driving-wheel and pinion $f'$ on shaft $f^6$. The shaft $f^4$ carries the rollers for moving the belts $d$. It also drives the pitman $g$, for operating the cutter-bar $g'$, and by means of a belt from pulleys $g^2$ to $g^3$ it operates the reel, as before mentioned, by the pulleys $c^4$ on the shaft $a^7$. The cone-gearing $g^4$ $g^5$ $g^6$ is arranged on a sliding sleeve, $g^7$, on the square portion $h$ of the shaft $a^7$, so as to slide easily along it back and forth, (see Fig. 22,) and is provided with the usual collars, $h'$, for supporting the ring $h^2$, which is connected by the pins $i$ to the lever $h^3$. (Shown in Figs. 1 and 2.) It is operated for sliding the sleeve back and forth along the shaft, and also the cone-gearing with it.

The object in making the cone-gearing adjustable along the shaft is to adjust it for bundles of different thicknesses of grain. In light grain the binding mechanism should run slower than for heavy grain. In working heavy grain the cone is moved so that the largest gear-wheel, $g^6$, will engage with the wheel $h^5$, and in working heavier grain it can be made to engage with any of the other gears in the cone. The wheel $h^5$ is arranged on the arm $h^6$, hung on the shaft $i^7$. From the arm $h^6$ is a link, $i'$, jointed thereto at $i^2$, the opposite end of the link being connected to the pivoted lever $i^3$ by a joint, $i^4$. The levers $h^6$ and $i^3$ are kept up by a spring, $i^5$. (See Fig. 1.) On the outer end of the lever $i^3$ is a stirrup, $i^6$, (shown in Fig. 1,) into which the foot of the driver is placed. It will now be seen that a pressure of the foot down will, through the arm or lever $i^3$ and link $i'$, move the arm $h^6$, and thereby bring the wheel $h^5$ into gear with either of the wheels $g^4$ $g^5$ $g^6$, (shown in Figs. 1, 2, and 22,) that may be directly under it, and thereby increase or diminish the speed of the shaft $i^7$, which shaft operates the binding mechanism by means of the wheel $h^7$ and the bevel-gearing $j$ $j'$. The wheel $j'$ is connected to the shaft $j^2$, which passes through or under the beam $j^3$. At the opposite end of the shaft $j^2$ is a crank, $j^4$, which connects with the curved binding-arm by a joint, $j^5$. The beam $j^3$ is connected to and forms a part of the standard $j^6$. This standard is fastened to the platform, and has a box, K, at the top for holding the ball of binding-twine K'. The opposite side of the curved binder-arm $K^2$ is provided with a compressor-arm, $K^3$, jointed to it by a pin, $K^4$. Both the binder-arm and the curved compressor-arm $K^3$ are kept in place and from opening out too far by a slotted plate, $K^5$. (See Figs. 2, 4, and 5.) When not inclosing a bundle of grain, they are kept open by means of the springs $K^6$ $K^7$ and the chains $l$, which pass from the springs to and over the friction-rollers $l'$ and through the binder and compressor arms, (see Figs. 4, 5, 6,) and are provided with the stops $S^8$ $S^9$, which allow the chain and springs $K^6$ $K^7$ to hold the arms apart a specified distance equal to the length of the chain $l$ between the stops $S^8$ $S^9$, (see Figs. 5 and 6;) but when the bundle is in, as shown in Fig. 4, its action, as it is forced in against the chain into the arms, causes the binder and compressor arms to close. The springs $K^6$ $K^7$ give enough to allow for the increased length of chain required, and when the binding mechanism is in the position shown in Fig. 5, the arms and bundle being swung off from the table, (and there being nothing to hold the bundle in,) the springs open the arms, as shown, and drawing on the chain throws it forward into a straight line, and the bundle is thereby thrown out. The lower inner side of the binder-arm is provided with a recess or depression, $l^2$, so as to allow it to move by the knotter and to carry the twine into it, and still pass by it without touching it. (See Fig. 21.) The binder and compressor arms receive their movements from the crank $j^4$, so that they have a reciprocating movement up and down as well as horizontally back and forth. The knotting device is arranged directly below the platform and as near to it as possible. It is placed in slideways $l^5$, so as to be capable of a reciprocating movement back and forth by the action of the binder and compressor arms. The compressor-arm, in its inner or forward movement, catches against the friction-roller $l^4$ (see Figs. 4, 6, 8, and 11) and forces the knotter-carriage $l^5$ in from the discharge side of the machine, and the binder-arm catches in its outward movement on the same roller $l^4$ and forces it back again. In this way the whole operation of the knotter is produced.

$l^6$ represents the knotter. It consists of an inner longitudinally-movable non-revolving portion, $m$, having a face-plate, $m'$, and a longitudinally-movable knot-forming hook, $m^2$, arranged to move easily within it. The portion $m$ (see Fig. 8) is provided at its rear end with an extension-piece, $m^3$, having a friction-roller, $m^4$, and the hook $m^2$ is provided at its rear end with an extension-piece, $m^5$, and a friction-roller, $m^6$. The portion $n$ turns on the portion $l^6$, and is operated by means of the pinion $n'$, which is secured to it in any well-known way, and engages in the rack $n^2$. (See Fig. 7.) The portion $n$ is provided with a pawl, $n^3$, secured to it by a joint, $n^4$, and is kept forward in position by means of a spring, $n^5$. In the parts $l^6$ is a slight depression, $n^6$, having a flat face for the pawl $n^3$ to press against and turn it in the direction of the arm. (See Figs. 9 and 10.) The depression $n^6$ runs off gradually to nothing in the opposite direction, so that the pawl passes around and over the depression while turning the opposite way without turning the sleeve or portion $l^6$. On the portion $l^6$ is a collar, $n^7$, having a groove, $o$. It is connected with a looping-hook, $o'$, which passes through the part $l^6$, (see Figs. 7, 10, 12, 13, 14, 15, 16, 18, and 19,) and is provided with an opening, $o^2$, to receive the twine. (See Figs. 8 and 11.) It receives its movements by means of a plate, $o^3$, adapted to fit the groove $o$, which plate is secured to a bar, $o^4$, having a friction-roller, $o^5$, on its under side. As the knotter is reciprocated back and forth the roller $o^5$ moves with it, and as it does so it passes along the pivoted bar $o^6$, (shown in Fig. 8,) the inclined face $p$ of which causes the roller to move the bar $o^4$, plate $o^3$, and looping-hook $o'$ in the direction of the arrow $v$. As the knotter-carriage passes farther along in the same direction, the roller $o^5$ causes the bar $o^6$ to turn on its center pin, $p'$, so as to allow it (the roller $o^5$) to pass along and pass its end, (see dotted lines $p^2$,) so as to pass the inclined face $p^3$ of the stationary bar $p^4$, which moves the bar $o^4$ and connecting parts and the looping-hook outward, or in an opposite direction to the arrow $v$. The spring $p^5$ draws the pivoted bar $o^6$ back again as soon as the roller $o^5$ passes through.

The knife $r$, for cutting off the twine, is pivoted by a pin, $r'$, to a portion of the twine-holding device, and receives its movements by a bar, $r^2$, having a friction-roller, $r^4$, the knife being connected to it by a pin, $r^3$. It is operated by the same mechanism that moves the looping-hook, only it operates a little behind the movements of said looping-hook, as will be seen. The fore part of the twine-holder $r^6$ passes over the bar $o^4$, through the front frame, $r^5$, of the knotter, and through the plate $o^3$, (see Fig. 11,) and finally through the lower guide, $r^7$. (See Figs. 11 and 12.) The back end of the twine-holder bar passes through the back frame-work, $r^8$, of the knotter, a portion of which is broken away to expose the mechanism below it. This portion of the bar $r^6$ is in the form of a frame, two sides, S, of which are straight or nearly straight, and the sides S' are curved. Below it is a ratchet-wheel, $S^2$, (shown partly in dotted lines,) having six teeth, more or less; but the number shown answers the purpose. It turns on a center, $S^3$, and is provided with three friction-rollers, $S^4$.

$S^6$ is a pawl arranged on a pin, $S^7$. It is provided with a spring, $t$, to force it forward in the direction of the arrow. (See Fig. 11.) This pawl is arranged at a stationary point on the frame, and turns the wheel $S^2$ as the knotter moves back. On the other side of the wheel $S^2$ is another pawl, $t'$, secured to the knotter-frame by a pin, $t^2$, and held against the wheel by a spring, $t^3$. Its object is to prevent the wheel from turning back as it moves each notch ahead. It will be seen by this construction that the twine is held and released during the backward movement of the bar, when the twine is placed in the opening $t^4$ of the guide $r^7$. As the hook $t^5$ on the bar moves into the opening on one side of the opening $t^4$ it carries the end of the twine in with it, as shown by the dotted lines, $t^6$, and when it moves the other way the same operation is repeated on the other side of the opening $t^4$.

In the binder and compressor arms $K^2$ $K^3$, it will be noticed that they receive their movements by the crank $j^4$, and the upper end of the binder-arm is held by a link, $t^7$, jointed to it by a pin, $t^8$, and to a bracket or arm, $u$, on the beam $j^3$ by a pin, $u'$. (See Figs. 4, 5, and 6.)

The operation of the machine is as follows: As the machine advances, the grain is thrown onto the platform, as shown in Fig. 2, and is caught by the teeth $c^5$ on the belts $d$ and carried along the platform in the direction of the arrow $v'$, over the plates $d'$, and under the shield and compressor $d^2$. Just as it passes out from under the wires $e$ it is in position to be caught by the binder and compressor arms, where it is compressed into a bundle, as shown in Fig. 4. In passing over the plates $d$ there are two strips, $u^2$, which project up sufficiently high to allow the binder-arm to get behind the bundle as it passes downward with the thread. It will be noticed that just prior to the binder-arm moving downward the compressor-arm $K^3$ has advanced to the limit of its movement in a direction opposite to the arrow $v'$, and that it has moved the knotter-carrying frame to the limit of its movement in the same direction. It will be also noticed that as it takes the bundle it forces the chain $l$ and also the binding-twine up in the form of a curve, partly surrounding the bundle, which operation causes the arms to close toward each other, as shown in Fig. 4, and compresses the bundle. In Fig. 6 the binder and compressor arms are in position for gathering up grain enough to form a bundle. The end of the twine $v^3$ is held by the twine-holder, and it passes thence to and through the point of the binder-arm. In this position it will be readily seen that as the grain is forced into the binding and compressor arms the twine is forced into the position shown by the dotted lines $v^4$, which would place the bundle as shown in Fig. 4. The binder and compressor arms are now moving downward and forward in the direction of the arrows $v^5$ $v^6$, the twine being around the bundle and the end held fast in the twine-holder, as before mentioned, the binder-arm brings the other end down first into the hook $m^2$ and then into the twine-holder. (See Fig. 12.) The binder-arm $K^2$ now moves the knotter-carrying frame in the direction of the arrow $v^5$. Here it would be well to mention that the depression $n^6$ in the knotter $l^6$ is long enough to prevent the part $l^6$ from turning until the binding-twine is in position in the looping-hook and cord-holder, as above mentioned—that is, the pawl $n^3$ cannot cause it to turn until it reaches the shoulder of the depression to push against, as in the movement of the knotter in a contrary direction to the limit of its movement it has moved a portion of a revolution past the shoulder $v^7$, so that in the reverse movement it has to turn a part of a revolution before the pawl begins to act. During this time the twine is placed in position and held as shown in Fig. 12, and also cut off. In pushing the knotter in the direction of the arrow $v^5$ the rack $n^2$, which engages with the pinion $n'$, causes the portion $l^6$ to turn at the time above mentioned. The thread or twine around the bundle is now cut off, as before mentioned, and both ends held by the looping-hook $o'$ separate from the twine in the binder-arm $K^2$ which passes from the eye of the binder-arm, and is held by the twine-holder. As the knotter continues its movement until $l^6$ has made three-quarters of a revolution it assumes the position shown in Figs. 13 and 14; here the two ends of the twine have been carried around the non-turning stem $m$, a portion being in the knot-forming hood $m^2$. At this point the friction-roller $m^4$ (see Fig. 8) has advanced to the point shown by the dotted lines $w$, and against the inclined downwardly-projecting pieces $w'$. (Shown in side elevation in Fig. 7 and top view in dotted lines in Fig. 8.) As the knotter-carriage advances it will be obvious that the friction-roller $m^4$ will cause the knot-forming hook $m^2$ to draw inward, as shown in Fig. 14, and to draw a portion of the loop in with it. The knotter in its further movement in the same direction makes a complete revolution and lays a portion of the cord outside of the loop-forming hook $m^2$, as shown in Fig. 15. As the movement continues the friction-roller $m^6$ advances to the point $w$ and the friction-roller $m^4$ passes over the inclined pieces $w'$, which operation allows the loop-forming hook $m^2$ to spring forward against the face-plate $m'$ and to catch and hold that portion of the twine which passes outside of the hook $m^2$. The passing of the friction-roller $m^6$ over or past the face of the inclined piece $w'$ brings the non-revoluble stem in and pushes the loop that surrounds it off. The looping-hook $O'$ is at the same time pushed out, as shown in Fig. 16, and releases the cut end of the twine. A movement of the knotter farther in the same direction allows both friction-rollers $m^4$ $m^6$ to pass by the inclined piece $w'$, and allows both the knot-forming hook $m^2$ and non-revolving stem $m$ to pass out again, as shown in Fig. 17. In this position the loop is held in position shown in said figure. In Fig. 18 the knot is shown as completed and the loop portion ready to be pulled out as the bundle is thrown out, as shown in Fig. 5.

In Fig. 19 the knotter is in position to receive more twine for tying another bundle when the binding-arm $K^2$ brings it around.

In the foregoing description and drawings I have shown suitable devices for accomplishing the several purposes mentioned; but the form and arrangement of many of the parts may be varied without changing the nature of my invention. For instance, in some cases where a spring is used a positive movement may be given in any well-known way; or the shape of some of the various parts may be altered in various ways so long as they accomplish the result described in substantially the same way. By this arrangement of the knotting mechanism it will be seen that the knot, when tied, is in the form of a bow-knot, which can be easily untied when required.

I claim—

1. The combination of the endless apron $d$, rollers $e^5$, a series of pivoted plates, $d'$, arranged so as to leave the openings $f^5$ through which the teeth pass, and means for operating the same, substantially as specified, for the purpose of bringing long or short grain to the binding mechanism in the proper position to be bound, as described.

2. In a low-down grain-binder, the combination of the platform and a series of grain-carrying belts provided with teeth, and the pivoted plates $d'$, between which the teeth are guided as they move forward, and a suitable mechanism, substantially as described, for changing the position of the plate, whereby the direction of the movement of the belts and teeth is effected so as to adapt them to bring long or short grain to the binding mechanism in the proper position to be bound, as described.

3. In a low-down grain-binder, the combination of a series of grain-carrying belts provided with teeth, the pivoted plates $d'$, means for operating them, substantially as described, and a spring shield or compressor beneath which the grain is carried to the binder, as set forth.

4. The combination of the plates $d'$, the shield and compressor $d^2$, supported on posts $e^2$, provided with springs $e^3$, and the bent rods $e$, for the purpose of receiving, holding, and compressing the grain, substantially as described.

5. The combination of the knotter-carrying frame, the binder and compressor arms provided with a chain having the stops $S^8 S^9$ and springs, substantially as described, and connected to a support and together and to a crank from which they receive the motion whereby they receive the several movements specified and the bundle is gathered, compressed, tied, and thrown out, substantially as described.

6. The binder and compressor arms connected together by a pin, $K^4$, and to the supporting-bar $u$ by the link $t^7$, so as to receive their motion by a crank, $j^4$, in combination with the springs $K^6 K^7$ and a chain, $l$, provided with stops $S^8 S^9$, for the purpose of receiving, compressing, and delivering the bundle, substantially as described.

7. The knife for cutting the twine, arranged on a center, $r'$, and connected to a bar, $r^2$, in combination with a friction-roller, $r^4$, inclined-faced pivoted plate $o^6$, stationary inclined plate or bar $P^4$, and the movable knotter-carriage, for the purposes specified.

8. The plate $o^3$, collar $n^7$, arranged upon a bar, $o^4$, having a friction-roller, $o^5$, in combination with the inclined faced pivoted bar $o^6$, and inclined faced bar $p^4$, for the purpose of moving in and out the looping-hook $o'$, substantially as described.

9. The bar $r^6$, having the cord-clamping end $t^5$ and the opening with curved and straight sides, as specified, in combination with the pivoted ratchet-disk having friction-rollers $S^4$ and holding-pawl $t'$, and the stationary slideway provided with a pivoted pawl for operating the ratchet-disk, substantially as and for the purposes described.

MELVIN W. KNOX.

Witnesses:
J. M. CALDWELL,
A. J. SANGSTER.